Inventor
Robert B. Rhoades
By
Brown, Jackson, Boettcher & Dienner
Att'ys.

Inventor
Robert B. Rhoades
By
Brown, Jackson, Boettcher & Dienner
Att'ys.

Inventor
Robert B. Rhoades
By Brown, Jackson, Boettcher & Dienner Att'ys.

Inventor
Robert B. Rhoades
By
Brown, Jackson, Boettcher & Dienner
Att'ys.

Inventor
Robert B. Rhoades
By
Brown, Jackson, Boettcher & Dienner
Att'ys.

Inventor
Robert B. Rhoades
By
Brown, Jackson, Boettcher & Dienner
Att'ys.

United States Patent Office 3,419,686
Patented Dec. 31, 1968

3,419,686

MULTI-TRACK BI-DIRECTIONAL TAPE RECORDER WITH UNI-DIRECTIONAL ACTUATED TRAVERSING TRANSDUCERS

Robert B. Rhoades, Coloma, Mich., assignor to V-M Corporation, Benton Harbor, Mich., a corporation of Michigan Filed May 28, 1964, Ser. No. 371,020
11 Claims. (Cl. 179—100.2)

ABSTRACT OF THE DISCLOSURE

A tape recorder having two offset alternately operative transducer heads across which magnetic tape is moved from one reel to a second reel to permit continuous recording in a series of tracks. Each reel has a tab which is released when the tape is unwound therefrom to actuate a slide positioned therebetween which operates mechanism to reverse the direction of the tape travel and also to switch operation from one head to the other. The slide also moves the two heads transversely of the tape after the tape has been scanned by both heads. This it obtains by means of a spring which is resisted by the spaced lands of a rotary cam. The rotary cam operates by means of a pawl which engages the cam when the slide is moved in one direction but slides thereover when the slide is moved in the opposite direction. Movement of the tape is obtained by a motor driven capstan against which the tape is held by a pressure roller supported upon a yoke carried on a manually actuatable slide, the pressure roller yieldably urging the tape against the capstan when the slide is moved into its operating position.

The present invention relates to an improved tape recorder of the type wherein magnetic tape is fed from one reel to another across a head member for recording sound on the tape or reproducing sound therefrom. Certain of the features of the present invention are applicable to tape recorders generally, while other features are intended for use with multi-track bi-directional tape recorders where a plurality of sound tracks are recorded on a reel of tape and where recording and reproducing is effected while the tape is moving in either direction from one reel to the other.

One object of the present invention is to provide an improved tape transport mechanism for driving the take-up reel of a bi-directional tape recorder regardless of the direction in which the tape is moving.

Another object of the invention is to provide an improved mechanism for shifting the head transversely of the tape in order to permit continuous recording and reproducing from a plurality of sound tracks on the tape.

An additional one of my objects is to provide improved means for mounting a pressure roller and for moving such roller into an operative position for holding the tape against a capstan for driving the tape.

Other advantages and uses of my invention will be apparent, or become so, as I describe the invention in greater detail in conjunction with the accompanying drawings in which.

Figures 14, 15:
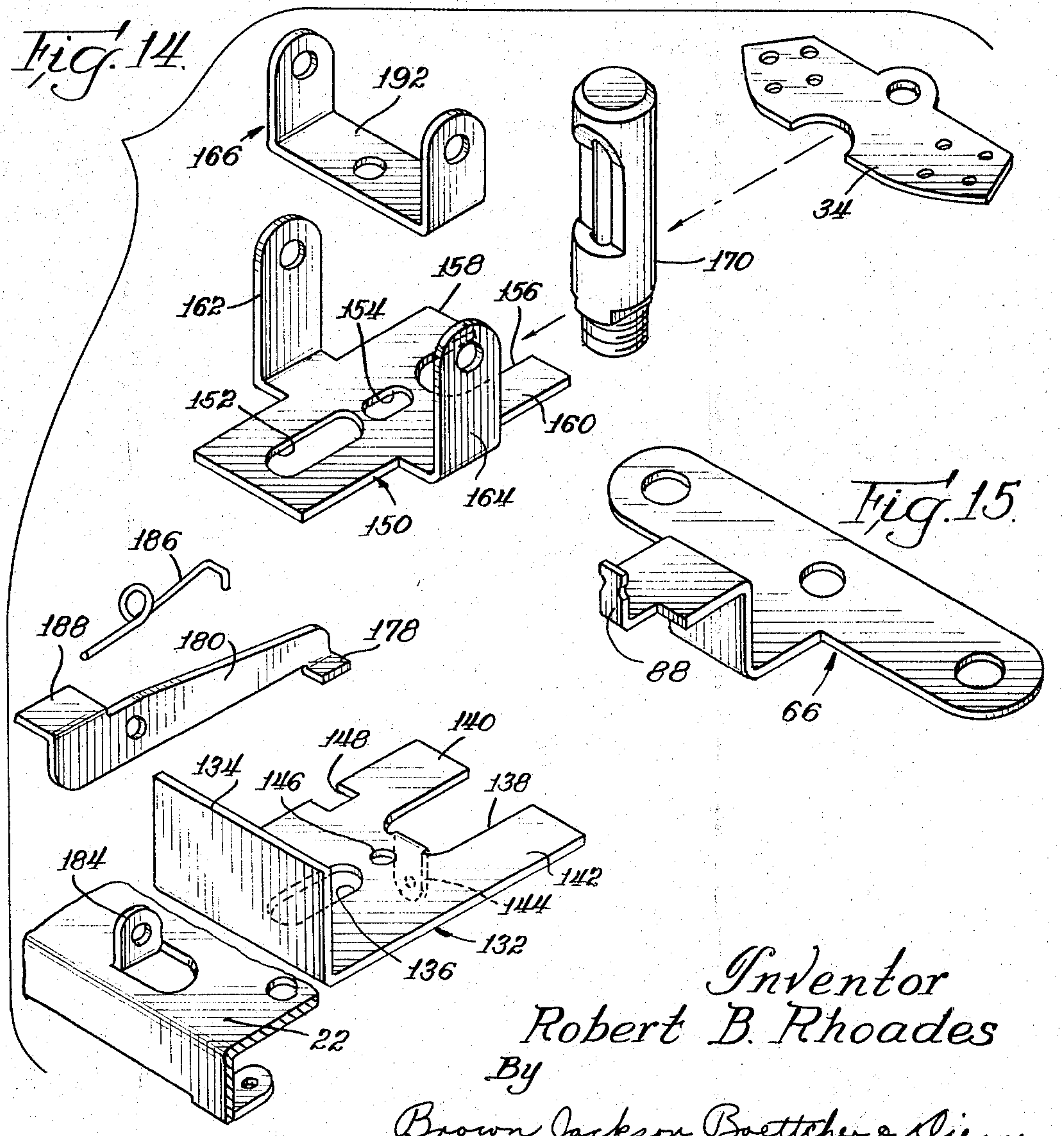

FIGURE 14 is an exploded perspective view principally showing the components of a manually operable slide assembly for mounting a pressure roller and moving the same to an operative position for urging the tape against a drive capstan; and FIGURE 15 is a perspective view of a pivotal mounting bracket for carrying a pair of tension pulleys comprising components of the drive mechanism for driving the take-up reel, such pulleys being alternately operative in accordance with the direction of movement of the tape.

Figure 1:
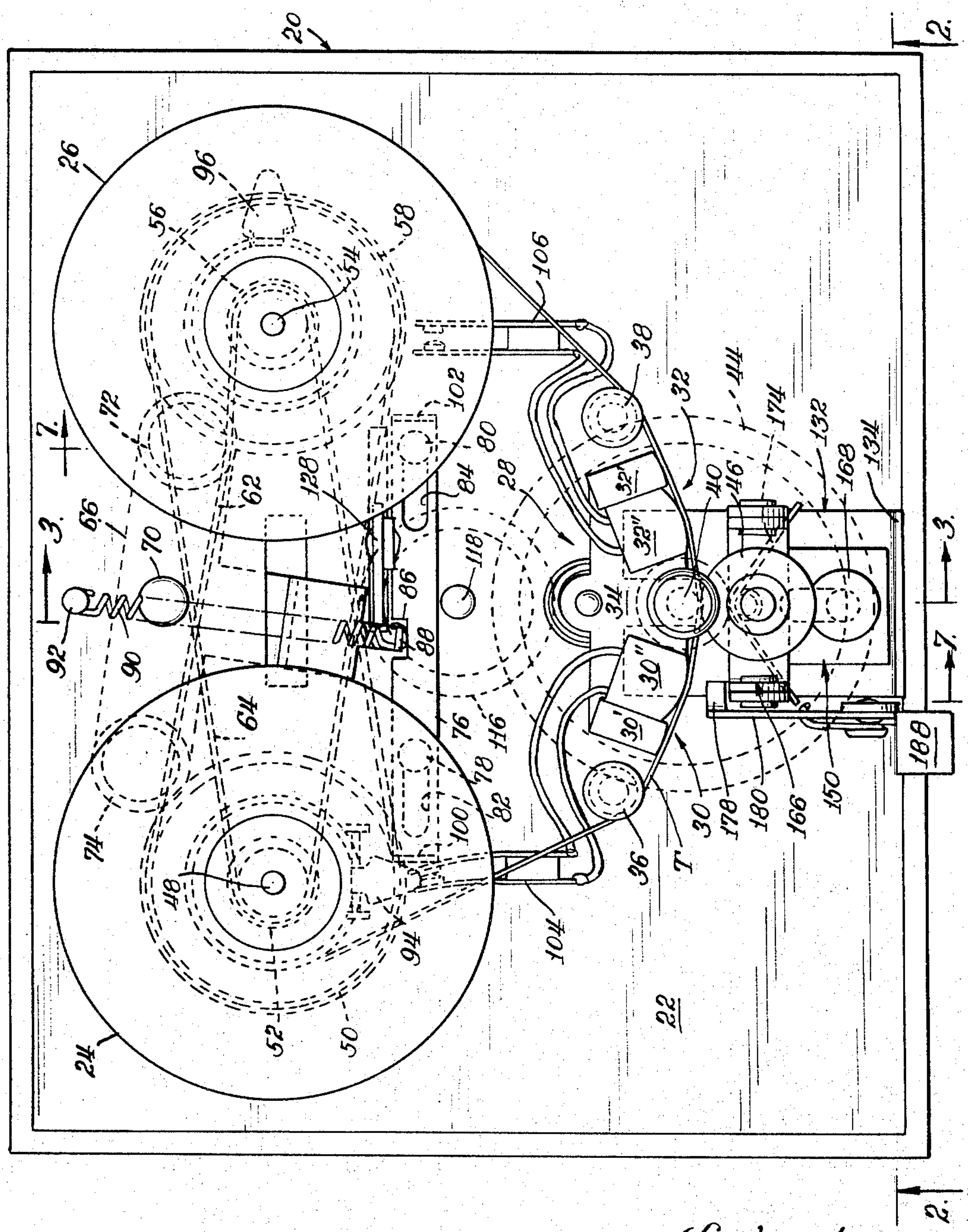
FIGURE 1 is a top plan view of a tape recorder constructed in accordance with the present invention.
Figure 2:
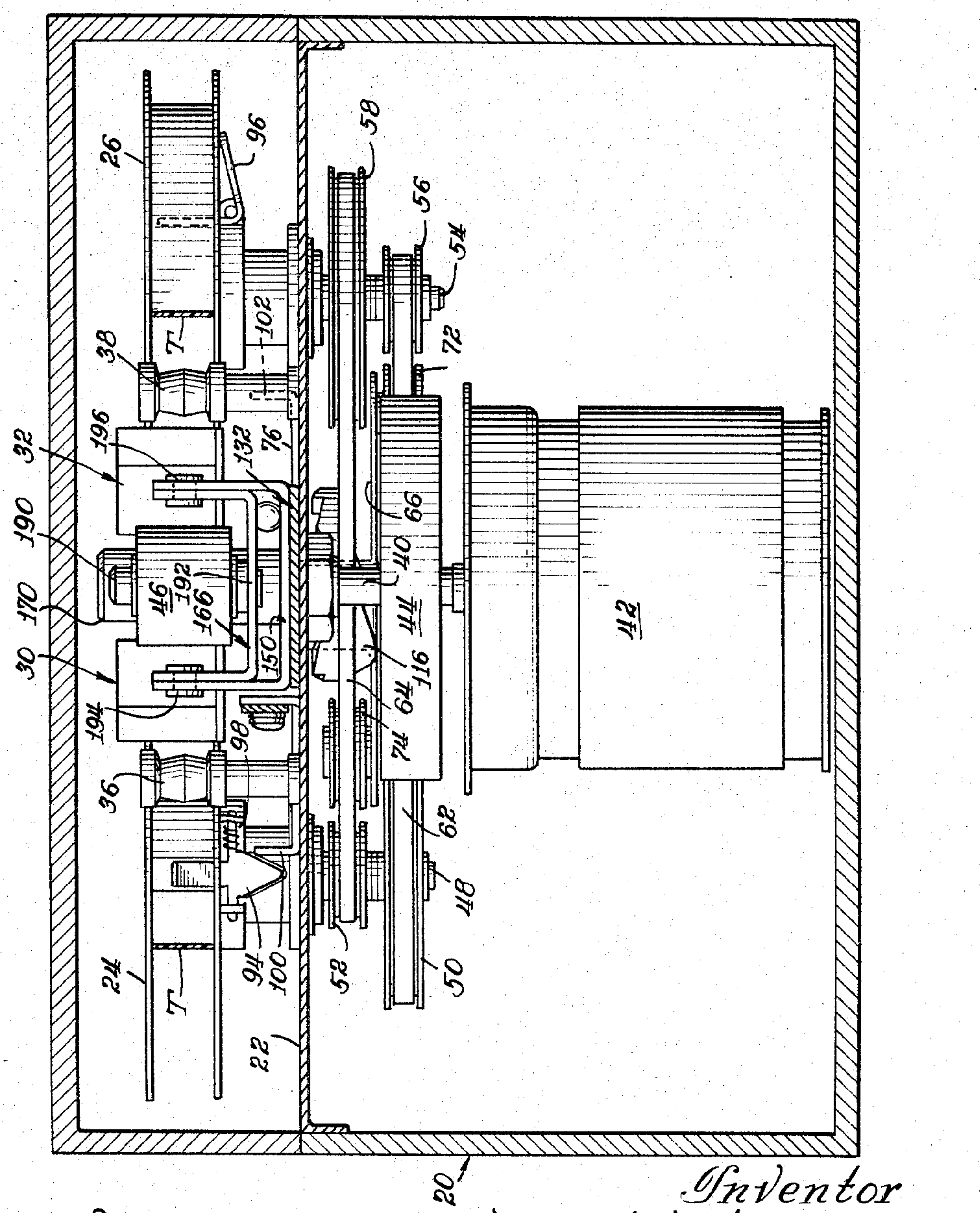
FIGURE 2 is a vertical sectional view taken substantially along the line 2—2 of FIGURE 1 most of the various components inside the cabinet of the tape recorder being shown in front elevation.

Referring now to the drawings, FIGURES 1 and 2 show a cabinet 20, a baseplate 22, and a pair of tape reels comprising a left hand reel 24 and a right hand reel 26. A head assembly 28 includes a pair of head members 30 and 32, the head member 30 comprising an erase member 30′ and a record-play member 30″, and the head member 32 comprising an erase member 32′ and a record-play member 32″. The two head members 30 and 32 are both mounted on a bracket 34 (see FIGURE 14) for vertical movement therewith, as will be described more fully hereinafter. A pair of vertically disposed guide rollers 36 and 38 are mounted above the baseplate 22 for guiding the tape, such rollers being disposed adjacent the erase heads 30′ and 32′. FIGURE 1 shows the manner in which the tape T passes from the left hand reel 24 over the guide roller 36, head member 30, head member 32 and guide roller 38 to the right hand reel 26, it being understood that the tape may be driven in either direction.

The tape is driven from one reel to the other by a capstan 40 which is disposed approximately between the record-play heads 30″ and 32″ (see FIGURE 1) and which is rotated by a motor 42 and flywheel 44 as shown in FIGURE 2. A pressure roller 46 is provided for holding the tape against the capstan 40 when the tape is to be driven, the pressure roller being movable away from the capstan when the tape is to be stopped. The motor 42 is reversible for driving the tape in either direction, and mechanism to be described hereinafter is provided for automatically reversing the direction of rotation of the motor when the tape has been fully wound on one of the reels 24 and 26.

It is important to understand that the two heads 30 and 32 are vertically offset a slight distance from one another. More specifically, the operative elements of the heads 30 and 32 are vertically offset a distance equal to the desired spacing between adjacent sound tracks on the tape. Such spacing is slight and is not readily apparent from the drawings. However, it will be understood that the heads 30 and 32 are alternately operative and switching from one head to the other is effected when the direction of tape travel is reversed, whereby it is only necessary to shift the head assembly 28 vertically every other time the direction of tape travel is reversed. Thus, when the tape moves in one direction, the head 30 is operative, and when the tape moves in the opposite direction, the head 32 is operative, whereby two tracks may be recorded or reproduced without shifting the head assembly, and thereafter the head assembly is shifted vertically to record or reproduce two more sound tracks on the tape. In the particular embodiment being described, eight tracks may be recorded on a single tape.

Figures 3, 4, 5:
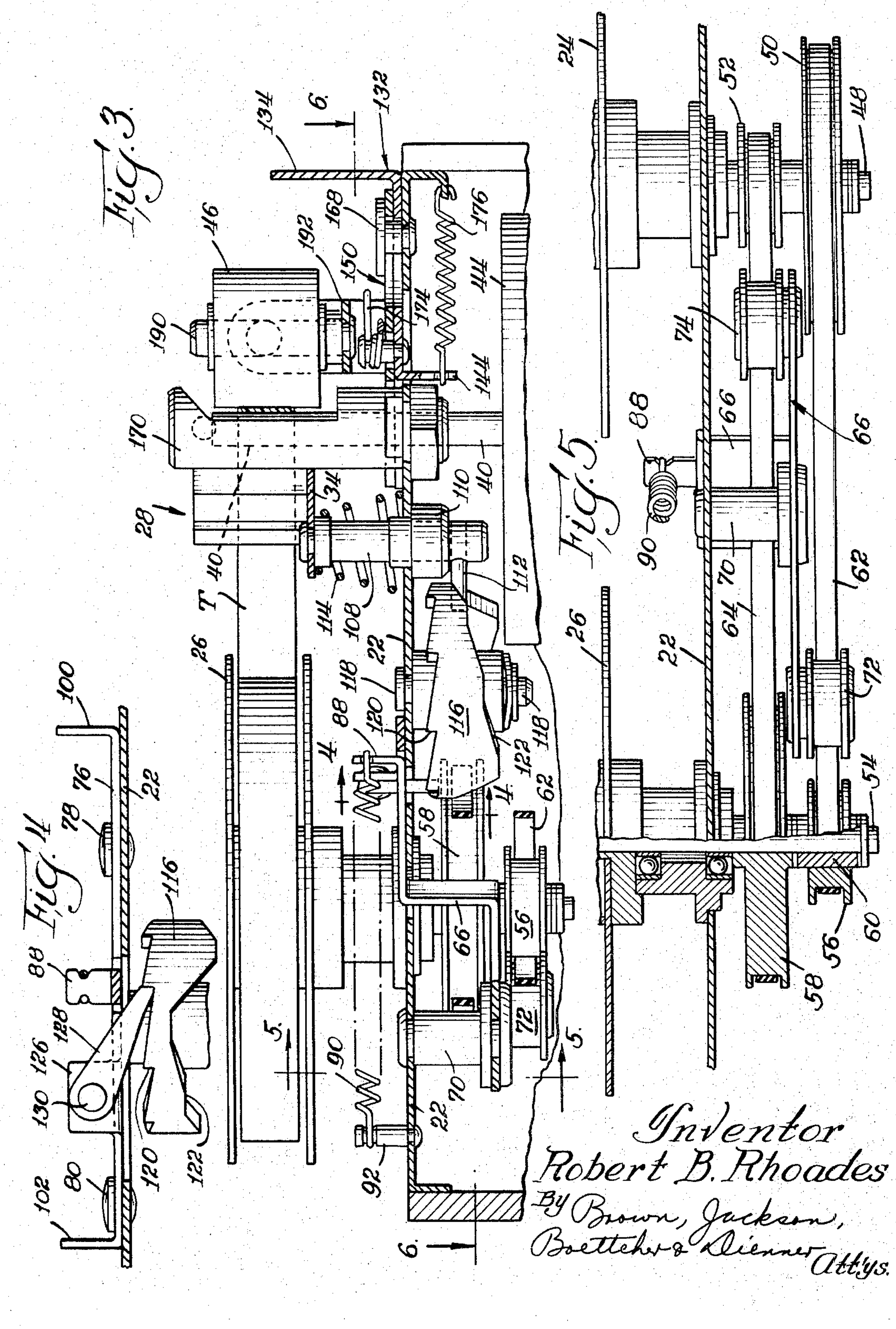
FIGURE 3 is an enlarged fragmentary vertical section, taken substantially along the line 3—3 of FIGURE 1.
FIGURE 4 is a fragmentary vertical section, taken substantially along the line 4—4 of FIGURE 3, showing the manner in which a pawl on a slide link member actuates a rotary cam for shifting the head transversely of the tape.
FIGURE 5 is a fragmentary vertical section, taken substantially along the line 5—5 of FIGURE 3, showing a belt drive mechanism for driving the reels of the tape recorder, certain parts being shown in rear elevation and others in section.

FIGURES 1, 2, 5 and 6 show mechanism for driving the take-up reel, that is, the reel upon which the tape is being wound, whether it be the left hand reel 24 or the right hand reel 26. As best shown in FIGURES 2 and 5, a left hand reel shaft 48 has a large diameter drive pulley 50 secured at the lower end thereof, and above the drive pulley 50 there is mounted a small diameter driven pulley 52. In contrast therewith, a right hand reel shaft 54 has a small diameter driven pulley 56 mounted at the lower end thereof, and above the driven pulley 56 there is mounted a large diameter drive pulley 58. The left hand drive pulley 50 is fixedly secured to the reel shaft 48 so that it will rotate with the reel 24, and similarly the right hand drive pulley 58 is fixedly secured to the reel shaft 54 so that it will rotate with the reel 26. The left hand driven pulley 52 is mounted on the shaft 48 for rotation therewith, so that when the pulley 52 is rotated it will in turn effect rotation of the reel 24. Similarly, when the right hand driven pulley 56 is rotated, it will effect rotation of the reel 26. However, the driven pulleys 52 and 56 are capable of slippage relative to their respective reel shafts 48 and 54, such slippage being permitted by clutch bushings such as shown at 60 in FIGURE 5.

Figure 6:
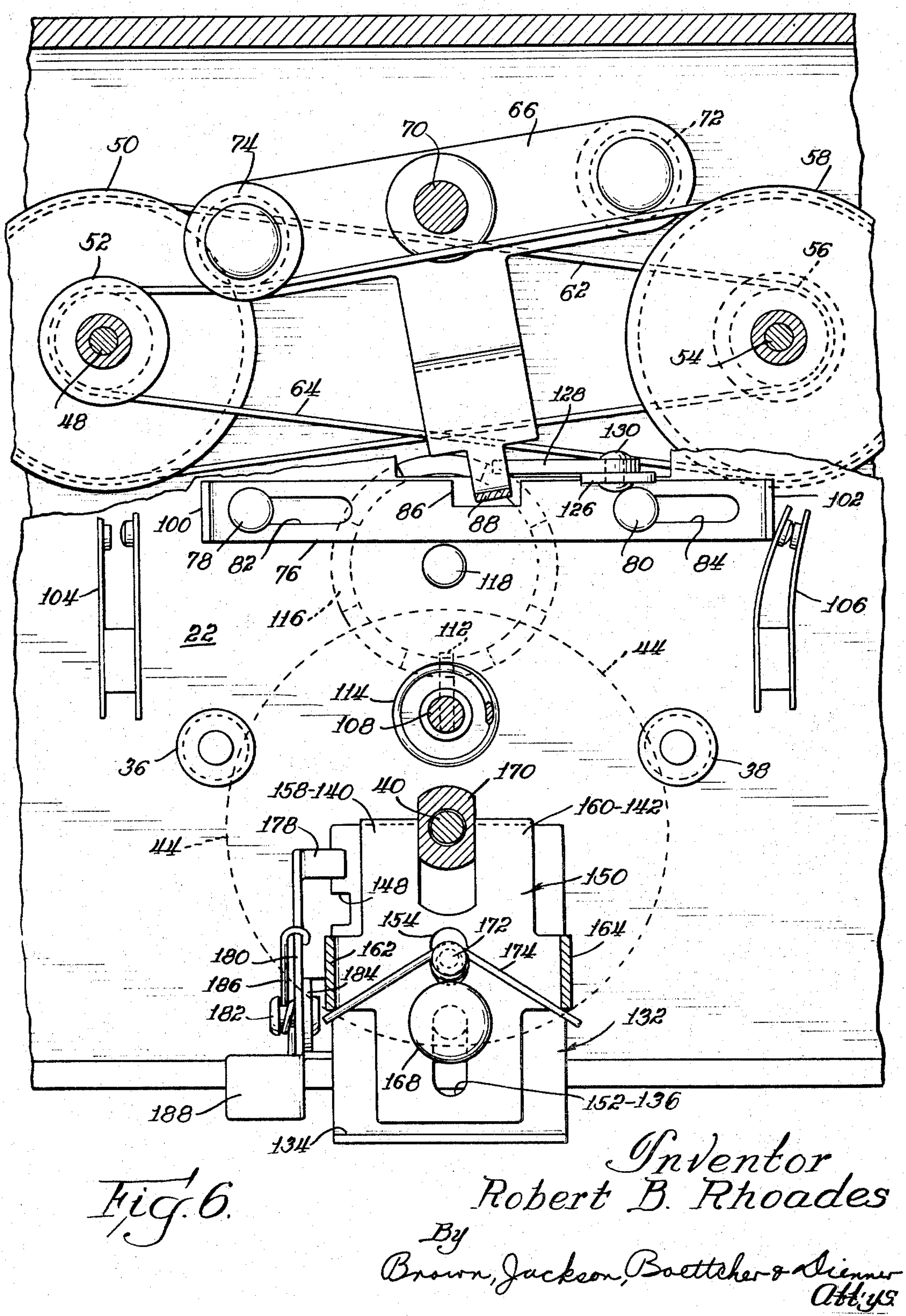
FIGURE 6 is a fragmentary horizontal sectional view, taken substantially along the line 6—6 of FIGURE 3, the manually operable pressure roller slide being shown in inoperative position.

The left hand drive pulley 50 is disposed in the same horizontal plane as the right hand driven pulley 56, and an endless belt 62 is mounted on these pulleys. Similarly, the left hand driven pulley 52 is disposed in the same horizontal plane as the right hand drive pulley 58, and an endless belt 64 is mounted on the latter two pulleys. The drive belts 62 and 64 are sufficiently loose as to be inoperative except when tensioned by corresponding tension pulleys. FIGURES 1, 6 and 15 show a generally T-shaped bracket 66 which is supported from the baseplate 22 by a shaft 70 (see also FIGURE 5) so as to be disposed in a horizontal plane which is vertically spaced between the lower and upper drive belts 62 and 64. At the right end of the bracket 66, a tension pulley 72 (shown at the left end of FIGURE 5 which is a view from the rear) is mounted beneath the bracket for rotation about a vertical axis, and at the left hand end of the bracket 66, a tension pulley 74 is mounted above the bracket for rotation about a vertical axis. The tension pulley 72 is vertically disposed so as to be engageable against the lower drive belt 62, and the tension pulley 74 is vertically disposed so as to be engageable against the upper drive belt 64. Accordingly, when the pivotal bracket 66 is in its clockwise position as shown in FIGURE 1, the tension pulley 72 is engaged against the lower drive belt 62 to render the latter operative to provide a driving connection between the drive pulley 50 and the driven pulley 56. When the bracket 66 is in its alternate or counterclockwise position as shown in FIGURE 6, the tension pulley 74 is engaged against the upper drive belt 64 to render the latter operative to provide a driving connection between the drive pulley 58 and the driven pulley 52.

A slide link 76 (see FIGURES 1, 2 and 6) is mounted on top of the baseplate 22 for sliding movement thereon, and a pair of headed rivets 78 and 80 project up from the baseplate through longitudinal slots 82 and 84 in the slide link for slidably mounting the latter. The slide link 76 is movable linearly on the baseplate between a left hand position as shown in FIGURE 1 and a right hand position as shown in FIGURE 6, and a centrally located cutout 86 in the link 76 receives a nose portion 88 formed at the bottom of the T-shaped bracket 66, whereby the linear movement of the slide link determines the pivotal position of the bracket. A tension spring 90 (see FIGURES 1 and 3) has one end anchored to the baseplate 22 by a stud 92, and the other end of the spring is secured to the nose portion 88 of the bracket 66. Thus, the spring 90 acts as an over-center spring, whereby once the bracket 66 is moved past its center position it will be held in either its clockwise or counterclockwise position as the case may be to tension one of the drive belts 62 and 64.

Each of the tape reels 24 and 26 has a movable tab for actuating the slide link member 76. FIGURE 2 shows a tab 94 which is pivotally mounted on the left hand reel 24, and a tab 96 which is pivotally mounted on the right hand reel 26. When tape is wound on a reel, the corresponding tab is held by the tape in an inoperative position as illustrated by the tab 96 shown in FIGURE 2. However, when the last layer of tape has been unwound from the reel, the tab is permitted to move to an operative position such as shown in connection with the tab 94 in FIGURE 2. A torsion spring or the like such as shown at 98 may be provided for biasing each tab to its operative position. It will be seen from FIGURE 2 that the tab 94 which is in operative position is adapted to engage an upright end portion 100 on the slide link 76, whereby as the reel 24 rotates, the tab 94 will strike the link portion 100 and move the link 76 to the right hand position of FIGURE 6, thus causing the upper drive belt 64 to be rendered operative. In a similar fashion, when the tab 96 on the rotating right hand reel 26 is permitted to move to its operative position, the tab will strike an upstanding portion 102 at the right hand end of the link 76 so as to move the link to the left hand position of FIGURE 1 and cause the lower drive belt 62 to be rendered operative.

It will now be understood that when the tape T is being driven by the capstan 40 from the left hand reel 24 to the right hand reel 26, the slide link 76 will be in the left hand position of FIGURE 1, and the drive belt 62 will be operative, whereby the tape itself will rotate the reel 24, and the drive pulley 50 which rotates with the reel 24 will drive the driven pulley 56 which in turn will rotate the take-up reel 26. Because the drive pulley 50 is substantially larger in diameter than the driven pulley 56, the take-up reel 26 will tend to be driven at a greater speed than the supply reel 24, so as to maintain the tape taut, and as previously mentioned the pulley 56 is capable of slippage on the reel shaft 54 so that it will rotate the take-up reel 26 at whatever speed is required to maintain the tape taut, regardless of the amount of tape which is wound on the reel.

Once the tape has been fully unwound from the left hand reel 24, the tab 94 will move the slide link 76 to the right hand position of FIGURE 6, whereupon the drive belt 62 will be rendered inoperative and the drive belt 64 will be rendered operative. The motor drive will then be reversed, and will be explained hereinbelow, and the tape will be driven from the right hand reel 26 to the left hand reel 24. In the latter situation, the drive pulley 58 will rotate with the reel 26, and the pulley 58 will drive the driven pulley 52 which in turn will rotate the left hand or take-up reel 24 at whatever speed is necessary to maintain the tape taut, slippage being permitted between the driven pulley 52 and the left hand reel shaft 48 to the extent necessary.

As previously stated, the direction of rotation of the motor 42 and capstan 40 is reversed when the tape has been fully transported from one of the reels 24 and 26 to the other, and at such times the alternate one of the heads 30 and 32 is rendered operative. FIGURE 1 shows in somewhat schematic form a pair of switches 104 and 106 which are disposed adjacent the opposite upright ends 100 and 102 of the slide link 76. It will be seen that when the tape is moving from the left hand reel 24 to the right hand reel 26, the slide link 76 is in its left hand position so that the end portion 100 engages the switch 104 and maintains it closed so as to render the head 30 operative, while the normally open switch 106 is open so as to render the head 32 inoperative. When the direction of tape travel is reversed and the slide link 76 moves to its right hand position, it will be understood that the switch 104 will open and the switch 106 will be closed as shown in FIGURE 6 so as to render the head 32 operative and the head 30 inoperative. In addition, it will be understood that the switches 104 and 106 are also associated with the power supply to the motor 42 to effect reversal of the motor whenever the slide link 76 moves from one side to the other.

Figure 7:
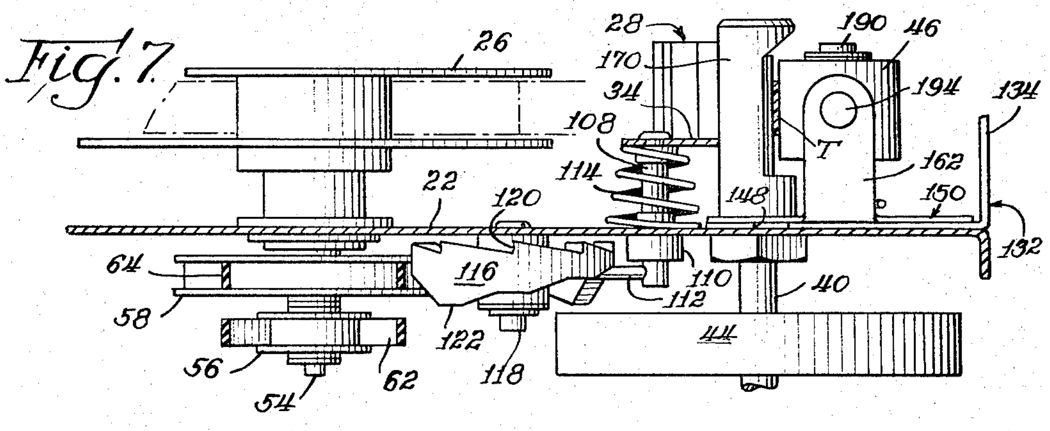
FIGURE 7 is a fragmentary vertical section, taken substantially along the line 7—7 of FIGURE 1, showing the manner in which the vertical position of the head assembly is controlled by a rotary cam member.

The mechanism for shifting the head assembly 28 vertically or transversely of the tape T will now be described. As previously stated, with reference to FIGURE 1, the two head assemblies 30 and 32 are both mounted on the same bracket 34 (see FIGURE 14) and are spaced vertically the distance between adjacent sound tracks on the tape. Referring now to FIGURES 3 and 7, the head mounting bracket 34 is secured to the upper end of a pin 108 which is vertically slidable in a bearing 110 fixed to the underside of the baseplate 22. Any suitable means is provided for preventing rotation of the pin 108 in the bearing 110, whereby the plate 34 can move vertically but cannot rotate. A cam follower pin 112 is fixed to the lower end of the pin 108 so as to project horizontally therefrom, and a compression spring 114 is mounted around the pin 108 and disposed between the bracket 34 and the baseplate 22 so as to bias the bracket to its uppermost position as shown in FIGURE 3. A rotary cam member 116 is mounted underneath the baseplate 22 adjacent the pin 108. The cam 116 is mounted for rotation on a vertical shaft 118 which depends downwardly from the underside of the baseplate 22, and the cam is provided with a plurality of ratchet teeth 120 on the top surface thereof and a plurality of stepped cam surfaces 122 on the underside thereof. It will be seen that the cam follower pin 112 on the upwardly biased pin 108 is engaged against one of the stepped cam surfaces 122 on the underside of the cam 116, whereby the rotary position of the cam will determine the vertical position of the head assembly 28.

Figures 8, 9, 10, 11:
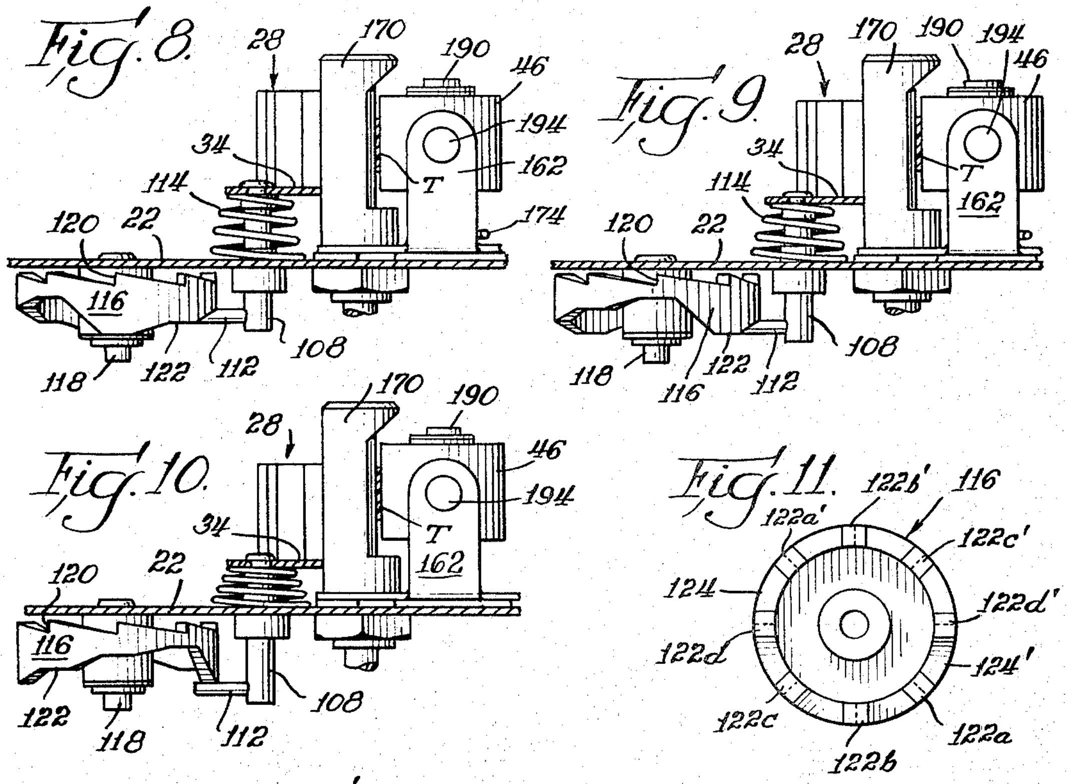
FIGURES 8–10 are fragmentary vertical sectional views similar to FIGURE 7 showing various vertical positions of the head assembly as determined by the different rotary positions of the cam member.
FIGURE 11 is a bottom plan view of the rotary cam member of FIGURES 7–10.
Figure 12:
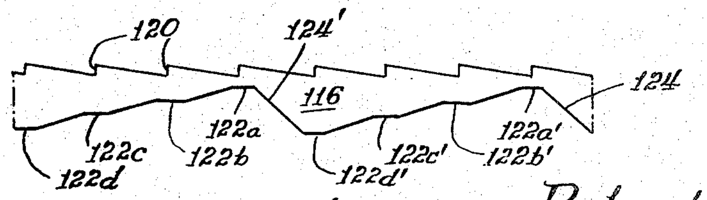
FIGURE 12 is a developed view of the cam member of FIGURES 7–10.
Figure 13:
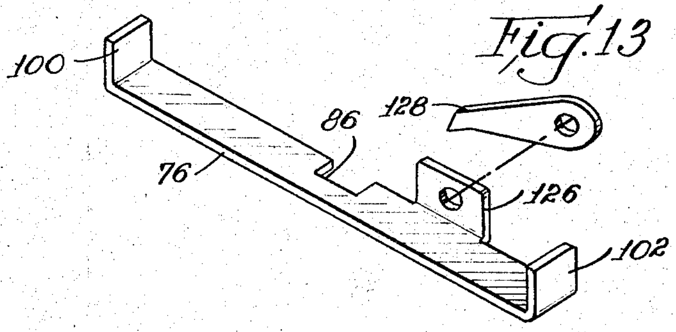
FIGURE 13 is an exploded perspective view of a slide link and a pawl which is attached to the link for advancing the rotary cam of FIGURES 7–10 upon linear movement of the slide link.

Referring to FIGURE 12, the uppermost flat surface on the underside of the cam 116 is indicated at 122*a*, the next highest surface at 122*b*, then 122*c*, and the lowermost surface being indicated at 122*d*, such horizontal surfaces being interconnected by inclined cam surfaces. In the initial position of the follower pin 112 it will be disposed on the cam surface 122*a*, at which time the head assembly 28 will be in its uppermost position as shown in FIGURES 3 and 7 to record or reproduce an uppermost track on the tape. As the cam 116 rotates counterclockwise (viewed from above), the pin 112 moves down an intermediate inclined cam surface and then onto the horizontal surface 122*b* whereby the head assembly 28 is lowered to the position of FIGURE 8, the spring 114 being compressed accordingly. Upon rotating the cam 116 counterclockwise a further increment, the pin 112 is moved down to the horizontal surface 122*c* causing the head assembly 28 to be lowered still further to the position of FIGURE 9, and when the cam is rotated to bring the pin 112 down to the cam surface 122*d*, the head assembly 28 will be in its lowermost position as shown in FIGURE 10. As can be seen from the developed view of the cam in FIGURE 12, a steep incline 124 follows the surface 122*d*, thus permitting the head assembly 28 to be moved quickly from the lowermost position of FIGURE 10 to the uppermost position of FIGURE 7, after which the earlier described cycle is repeated as the pin 112 is moved sequentially to surfaces 122*a'*, 122*b'*, 122*c'* and 122*d'*, and then up a steep incline 124' back to the surface 122*a*. Thus, the head assembly may be operative substantially continuously.

The mechanism for rotating the cam 116 will now be described, and for this purpose reference is made to FIGURES 4 and 6. The slide link 76 has an upwardly projecting tab 126 on which a pawl 128 is pivotally mounted by a pin 130. The pawl 128 projects somewhat downwardly from the slide link 76 so as to engage against the ratchet teeth 120 formed on the top surface of the rotary cam 116. It will thus be understood that when the slide link 76 is moved from right to left as viewed in FIGURES 1 and 6 (or left to right as viewed in FIGURE 4) the pawl 128 will act upon the ratchet teeth 120 so as to rotate the cam 116 one increment in the counterclockwise direction (viewed from above). On the other hand, when the slide link 76 is moved in the opposite direction, the pawl 128 will simply ride over the ratchet teeth 120 without advancing the cam 116. Thus, the head assembly 28 will be moved vertically only every other time the direction of tape travel is reversed, which is appropriate due to the provision of the alternately operative vertically offset dual head members 30 and 32 which comprise the head assembly.

The manually operable slide mechanism on which the pressure roller 46 is mounted will now be described. FIGURE 14 shows a lower slide 132 having an upright front end portion 134 which is adapted to be manually pushed to move the slide to an operative position. The slide 132 has a longitudinal slot 136 formed in the horizontal base portion thereof, and the rear end of the slide has a cutout portion 138 formed therein so as to define a pair of legs 140 and 142. A downwardly projecting tab 144 is formed at the front end of the cutout 138, and forwardly thereof a small aperture 146 is formed in the horizontal plate portion. In addition, a notch 148 is formed in one side of the horizontal plate portion of the slide. FIGURE 14 further shows an upper slide member 150 having a relatively long longitudinal slot 152, a shorter longitudinal slot 154 rearwardly thereof, and a cutout 156 at the rear of the slide so as to define a pair of legs 158 and 160. A pair of upright ears 162 and 164 are formed at opposite sides of the upper slide 150, and a U-shaped mounting bracket 166 is provided for mounting between the ears of the upper slide (see FIGURE 2).

FIGURES 3 and 6 illustrate the manner in which the lower slide 132 is mounted for sliding movement on the baseplate 22, with the upper slide 150 surmounting the lower slide, and with a rivet 168 projecting upwardly from the baseplate through the slots 136 and 152 for guiding the slide members. In addition, the leg members 140 and 142 on the lower slide and the leg members 158 and 160 on the upper slide straddle a housing 170 for the capstan 140 (see FIGURES 6 and 14), whereby the housing also serves to guide the slide members 132 and 150 which are thus permitted to slide forwardly and rearwardly toward and away from the capstan 40. Still referring to FIGURES 6 and 14, a stud 172 is mounted in the aperture 146 in the lower slide so as to project upwardly through the short slot 154 in the upper slide, and a torsion spring 174 is mounted on the stud 172 with its ends engaged against the ears 162 and 164 on the upper slide 150 so as to bias the upper slide rearwardly relative to the lower slide. Thus, the upper slide 150 is slidable forwardly and rearwardly relative to the lower slide 132, the extent of such relative movement being determined by the length of the slot 154.

A tension spring 176 (see FIGURE 3) has one end connected to the depending tab 144 on the lower slide 132 and its other end connected to the baseplate 22 near the front edge thereof, whereby the spring 176 biases the pair of lower and upper slides 132 and 150 to their forward or inoperative position as shown in FIGURE 6. When the upright portion 134 of the lower slide is manually pushed rearwardly so as to move both slides to rearward operative positions as shown in FIGURES 1 and 3, a tab 178 on a lock lever 180 (see FIGURES 1, 6 and 14) falls into the notch 148 to maintain the slides in such positions. The lock lever 180 is pivotally secured by a pin 182 to an upright tab 184 formed on the baseplate 22, and a spring 186 serves to bias the lever 180 toward its locking position. When it is desired to release the lower and upper slides 132 and 150 from their operative rearward positions, it is only necessary to press down on a forward end portion 188 of the lever 180 so as to release the lock and permit the spring 176 to return the slides to their forward positions.

The pressure roller 46 is supported on the U-shaped bracket 166 by a shaft 190 (see FIGURES 2 and 3) for rotation about a vertical axis, the shaft 190 being fixed to the bight portion 192 of the bracket so as to extend upwardly therefrom. The U-shaped bracket is then supported between the ears 162 and 164 of the lower slide 132 by a pair of pins or the like 194 and 196 as shown in FIGURE 2, whereby the bracket 166 comprises in effect a cradle for the pressure roller 46 which permits the latter to pivot about a horizontal axis for optimum alignment when the roller presses the tape T against the capstan 40. It will now be understood that in order to drive the tape T from one reel to the other, the lower slide 132 is manually urged rearwardly to the position shown in FIGURES 1 and 3. When the locking tab 178 falls into the notch 148 in the slide 132, the slide will be locked in operative position, and the pressure roller 46 will be positioned so as to press the tape against the drive capstan 40. It will further be understood that because the upper slide 150 on which the roller 46 is carried is yieldingly urged rearwardly relative to the lower slide 132 by the spring 174 as shown in FIGURE 6, the roller will be yieldingly urged against the capstan 40 so as to act on the tape with a predetermined amount of pressure.

While I have described my invention in a preferred form, I do not intend to be limited to that form, except insofar as the appended claims are so limited, since various modifications coming within the scope of the invention will readily occur to those skilled in the art, particularly with my disclosure before them.

I claim:

1. In a tape recorder of the type wherein a length of tape is driven from one reel across an information translating head member to another reel for recording sound thereon or reproducing sound therefrom, and wherein a plurality of sound tracks are recorded on a single tape, the improvement comprising, in combination, a head assembly embodying a pair of offset alternately operative information translating heads mounted for movement transversely of the tape for operatively engaging different transverse portions of the tape, actuating means operated by fully unwinding the tape off either reel to reverse the direction of tape travel and to switch from operation of one head to the other head, means for urging the head assembly in one direction transversely of the tape, cam follower means associated with said head assembly for moving the same transversely of the tape, and a rotary cam having a plurality of cam surfaces which act upon said follower means to move said head assembly opposite to said one direction, said actuating means intermittently rotating said rotary cam a predetermined increment every other time it reverses the direction of tape travel to shift said head assembly transversely of said tape.

2. In a tape recorder of the type wherein a length of tape is driven from one reel across an information translating head member to another reel for recording sound thereon or reproducing sound therefrom, and wherein a plurality of sound tracks are recorded on a single tape, the improvement comprising, in combination, an assembly of offset alternately operative information translating heads mounted for movement transversely of the tape for operatively engaging different transverse portions of the tape, actuating means associated with said reels so as to reverse the direction of tape travel at the end of tape travel off each reel and simultaneously switch operation of the heads, yieldable means for urging the head assembly in one direction transversely of the tape toward an initial operative position proximate one edge of the tape, cam follower means associated with said head assembly for moving the same transversely of the tape, a rotary cam having a plurality of cam surfaces which act upon said follower means to move said head assembly opposite to said one direction, said cam also having a substantially inclined cam surface for periodically permitting said yieldable means to return said head assembly to said initial position, and said actuating means being adapted for intermittently rotating said rotary cam a predetermined increment to shift said head assembly transversely of said tape after each head has been operated.

3. In a tape recorder of the type wherein a length of tape is driven first in one direction from one reel across a pair of offset alternately operative information translating head members to another reel for recording sound thereon or reproducing sound therefrom and then in reverse so that a plurality of sound tracks are recorded on a single tape, the improvement comprising, in combination, a head assembly embodying said pair of head members mounted for movement transversely of the tape for operatively engaging different transverse portions of the tape, yieldable means for urging the head assembly in one direction transversely of the tape toward an initial operative position proximate one edge of the tape, cam follower means associated with said head assembly for moving the same transversely of the tape, a rotary cam having a plurality of cam surfaces which act upon said follower means to move said head assembly in increments from said initial position to a position proximate an opposite edge of the tape, said cam also having a substantially inclined cam surface for periodically permitting said yieldable means to return said head assembly to said initial position, means switching operation of the head members each time the direction of tape travel is reversed, and actuating means for intermittently rotating said rotary cam a predetermined increment to shift said head assembly transversely of said tape, said actuating means being operated upon every other reversal of the direction of tape travel and being adapted to rotate said cam in one direction only.

4. In a tape recorder of the type wherein a length of tape is driven in either direction from one reel across a pair of offset alternately operative information translating head members to another reel for recording sound thereon or reproducing sound therefrom, and wherein a plurality of sound tracks are recorded on a single tape, the improvement comprising, in combination, a head assembly mounted for movement transversely of the tape for operatively engaging different transverse portions of the tape, yieldable means for urging the head assembly in one direction transversely of the tape toward an initial operative position proximate one edge of the tape, cam follower means associated with said head assembly for moving the same transversely of the tape, a rotary cam having a plurality of cam surfaces which act upon said follower means to move said head assembly in increments from said initial position to a position proximate an opposite edge of the tape, said cam also having a substantially inclined cam surface for periodically permitting said yieldable means to return said head assembly to said initial position, a plurality of teeth formed on the side of said cam opposite said cam surfaces, a reciprocating slide link extending approximately between the two reels of the tape recorder and movable linearly by a pair of projecting means which are associated respectively with the reels and which are alternately operative to move said slide link when the tape is fully unwound from one of the reels, and pawl means mounted on said slide link and operatively engaged with said teeth for rotating said cam one increment upon every other movement of said slide link, said pawl means being operative to advance said cam when said slide link is moved in one direction and being inoperative when said slide is moved in the opposite direction.

5. In a tape recorder of the type wherein a length of tape is driven in either direction from one reel across an information translating head member to another reel for recording sound thereon or reproducing sound therefrom, and wherein a plurality of sound tracks are recorded on a single tape, the improvement comprising, in combination, a head assembly embodying a pair of offset alternately operative information translating heads mounted for vertical movement transversely of the tape for operatively engaging different transverse portions of the tape, yieldable spring means for urging the head assembly upwardly toward an initial operative position proximate the upper edge of the tape, cam follower means associated with said head assembly for moving the same downwardly against the force of said spring means, a rotary cam having a plurality of cam surfaces which act upon said follower means to move said head assembly in increments from its initial upper position to a lower position proximate the lower edge of the tape, said cam also having a substantially inclined cam surface for periodically permitting said spring means to return said head assembly to said upper initial position, switching means for switching from operation of one head to the other head each time the direction of tape travel is reversed and actuating means operated by said switching means for intermittently rotating said rotary cam a predetermined increment every other time operation of the heads is switched to shift said head assembly transversely of said tape, said actuating means being adapted to rotate said cam in one direction only.

6. In a tape recorder of the type wherein a length of tape is driven in either direction from one reel across an information translating head member to another reel for recording sound thereon or reproducing sound therefrom, and wherein a plurality of sound tracks are recorded on a single tape, the improvement comprising, in combination, a pair of offset alternately operative information translating heads embodying a head assembly mounted on a vertically movable shaft for movement transversely of the tape for operatively engaging different transverse portions of the tape, a compression spring surrounding said shaft for yieldably urging said head assembly upwardly toward an initial operative position proximate the upper edge of the tape, cam follower means projecting from said shaft adjacent the lower end thereof for moving the head assembly downwardly against the force of said spring, a rotary cam having a plurality of cam surfaces on its underside which act upon said follower means to move said head assembly in increments from its initial upper position to a lower position proximate the lower edge of the tape, said cam also having a substantially inclined upwardly sloping surface on which said follower can ride upwardly thereby periodically permitting said spring means to return said head assembly to said upper initial position, and actuating means associated with said reels so as to reverse the direction of tape travel at the end of tape travel off each reel and switch from operation of one head to the other, said actuating means intermittently rotating said rotary cam a predetermined increment to shift said head assembly transversely of said tape every other time its reverses the direction of tape travel.

7. In a tape recorder of the type wherein a length of tape is driven in either direction from one reel across a pair of offset alternately operative information translating head members to another reel for recording sound thereon or reproducing sound therefrom, and wherein a plurality of sound tracks are recorded on a single tape, the improvement comprising, in combination, a head assembly mounted on a vertically movable shaft for movement transversely of the tape for operatively engaging different transverse portions of the tape, a compression spring surrounding said shaft for yieldably urging said head assembly upwardly toward an initial operative position proximate the upper edge of the tape, cam follower means projecting from said shaft adjacent the lower end thereof for moving the head assembly downwardly against the force of said spring, a rotary cam having a plurality of cam surfaces on its underside which act upon said follower means to move said head assembly in increments from its initial upper position to a lower position proximate the lower edge of the tape, said cam also having a substantially inclined upwardly sloping surface on which said follower can ride upwardly thereby periodically permitting said spring means to return said head assembly to said upper initial position, a plurality of teeth formed on the upper surface of said cam, a reciprocating slide link extending approximately between the two reels of the tape recorder and movable linearly by a pair of projecting means which are associated respectively with the reels and which are alternately operative to move said slide link when the tape is fully unwound from one of the reels, and pawl means mounted on said slide link and operatively engaged with said teeth for rotating said cam one increment upon every other movement of said slide link, said pawl means being operative to advance said cam when said slide link is moved in one direction and being inoperative when said slide is moved in the other direction.

8. In a tape recorder, in combination, a first rotatable reel shaft having a first tape reel mounted thereon, a second rotatable reel shaft having a second tape reel mounted thereon, a first large diameter drive pulley mounted on said first reel shaft for rotation therewith, a second large diameter drive pulley mounted on said second reel shaft for rotation therewith, a first small diameter driven pulley mounted on said first reel shaft for rotating the same, a second small diameter driven pulley mounted on said second reel shaft for rotating the same, said first drive pulley being mounted approximately in the plane of said second driven pulley and said second drive pulley being mounted approximately in the plane of said first driven pulley, a first endless belt mounted over said first drive pulley and said second driven pulley, a second endless belt mounted over said second drive pulley and said first driven pulley, said first and second belts being sufficiently loose as to be normally inoperative, movable mounting means carrying first and second alternately operative tension pulleys thereon, said mounting means being movable between a first position wherein said first tension pulley is engaged against said first drive belt to render the same operative and a second position wherein said second tension pulley is engaged against said second drive belt to render the same operative, reversible drive means for driving tape in either direction from one of said first and second reels to the other thereof, and means for actuating said movable mounting means to one of its first and second positions in accordance with the direction in which said tape is being driven, said mounting means being moved to its first position when said tape is being driven from said first reel to said second reel, and said mounting means being moved to its second position when said tape is being driven from said second reel to said first reel.

9. In a tape recorder, in combination, a first rotatable reel shaft having a first tape reel mounted thereon, a second rotatable reel shaft having a second tape reel mounted thereon, a first large diameter drive pulley mounted on said first reel shaft for rotation therewith, a second large diameter drive pulley mounted on said second reel shaft for rotation therewith, a first small diameter driven pulley mounted on said first reel shaft for rotating the same, a second small diameter driven pulley mounted on said second reel shaft for rotating the same, said first drive pulley being mounted approximately in the plane of said second driven pulley and said second drive pulley being mounted approximately in the plane of said first driven pulley, a first endless belt mounted over said first drive pulley and said second driven pulley, a second endless belt mounted over said second drive pulley and said first driven pulley, said first and second belts being sufficiently loose so as to be normally inoperative, a pivotal mounting bracket having first and second alternately operative tension pulleys thereon, said bracket being pivotable between a first position wherein said first tension pulley is engaged against said first drive belt to render the same operative and a second position wherein said second tension pulley is engaged against said second drive belt to render the same operative, reversible drive means for driving the tape in either direction from one of said first and second reels to the other thereof, and means for actuating said pivotal mounting bracket to one of its first and second positions in accordance with the direction in which said tape is being driven, said bracket being moved to its first position when said tape is being driven from said first reel to said escond reel, and said bracket being moved to its second position when said tape is being driven from said second reel to said first reel.

10. In a tape recorder, in combination, a first rotatable reel shaft having a first tape reel mounted thereon, a second rotatable reel shaft having a second tape reel mounted thereon, a first large diameter drive pulley mounted on said first reel shaft for rotation therewith, a second large diameter drive pulley mounted on said second reel shaft for rotation therewith, a first small diameter driven pulley mounted on said first reel shaft for rotating the same, a second small diameter driven pulley mounted on said second reel shaft for rotating the same, said first drive pulley being mounted approximately in the plane of said second driven pulley and said second drive pulley being mounted approximately in the plane of said first driven pulley, a first endless belt mounted over said first drive pulley and said second driven pulley, a second endless belt mounted over said second drive pulley and said first driven pulley, said first and second belts being sufficiently loose as to be normally inoperative, a pivotal mounting bracket having first and second alternately operative tension pulleys thereon, said bracket being pivotable between a first position wherein said first tension pulley is engaged against said first drive belt to render the same operative and a second position wherein said second tension pulley is engaged against said second drive belt to render the same operative, reversible drive means for driving the tape in either direction from one of said first and second reels to the other thereof, a reciprocating slide link extending approximately between said first and second reels and movable linearly by a pair of first and second projecting means which are associated respectively with the first and second reels and which are alternately operative to move said slide link when the tape is fully unwound from one of the reels, said slide link being operatively associated with said pivotal mounting bracket for actuating the latter whereby when the tape is fully unwound from said first reel said slide link will be moved so as to actuate said bracket to its second position and when the tape is fully unwound from said second reel said slide link will be moved so as to actuate said bracket to its first position.

11. In a tape recorder of the type wherein a length of tape is driven in either direction from one reel across a pair of offset alternately operative information translating head members to another reel for recording sound thereon or reproducing sound therefrom, and wherein a plurality of sound tracks are recorded on a single tape, the improvement comprising, in combination, a first rotatable reel shaft having a first tape reel mounted thereon, a second rotatable reel shaft having a second tape reel mounted thereon, a first large diameter drive pulley mounted on said first reel shaft for rotation therewith, a second large diameter drive pulley mounted on said second reel shaft for rotation therewith, a first small diameter driven pulley mounted on said first reel shaft for rotating the same, a second small diameter driven pulley mounted on said second reel shaft for rotating the same, said first drive pulley being mounted approximately in the plane of said second driven pulley and said second drive pulley being mounted approximately in the plane of said first driven pulley, a first endless belt mounted over said first drive pulley and said second driven pulley, a second endless belt mounted over said second drive pulley and said first driven pulley, said first and second belts being sufficiently loose as to be normally inoperative, a pivotal mounting bracket having first and second alternately operative tension pulleys thereon, said bracket being pivotable between a first position wherein said first tension pulley is engaged against said first drive belt to render the same operative and a second position wherein said second tension pulley is engaged against said second drive belt to render the same operative, reversible drive means for driving the tape in either direction from one of said first and second reels to the other thereof, a head assembly mounted for movement transversely of the tape for operatively engaging different transverse portions of the tape, yieldable means for urging the head assembly in one direction transversely of the tape toward an initial operative position proximate one edge of the tape, cam follower means associated with said head assembly for moving the same transversely of the tape, a rotary cam having a plurality of cam surfaces which act upon said follower means to move said head assembly in increments from said initial position to a position proximate an opposite edge of the tape, said cam also having a substantially inclined cam surface for periodically permitting said yieldable means to return said head assembly to said initial position, a plurality of teeth formed on the side of said cam opposite said cam surfaces, a reciprocating slide link extending approximately between said first and second reels and movable linearly by a pair of first and second projecting means which are associated respectively with the first and second reels and which are alternately operative to move said slide link when the tape is fully unwound from one of the reels, said slide link being operatively associated with said pivotal mounting bracket for actuating the latter whereby when the tape is fully unwound from said first reel said slide link will be moved so as to actuate said bracket to its second position and when the tape is fully unwound from said second reel said slide link will be moved so as to actuate said bracket to its first position, and pawl means mounted on said slide link and operatively engaged with said teeth for rotating said cam one increment upon every other movement of said slide link, said pawl means being operative to advance said cam when said slide link is moved in one direction and being inoperative when said slide is moved in the opposite direction.

References Cited

UNITED STATES PATENTS

| | | | |
|---|---|---|---|
| 2,430,538 | 11/1947 | Somers | 274—4 X |
| 2,468,198 | 4/1949 | Heller | 179—100.2 |
| 2,513,423 | 7/1950 | Owens | 179—100.2 |
| 2,668,059 | 2/1954 | Roberts | 179—100.2 |
| 2,857,164 | 10/1958 | Camras | 274—4 |
| 2,933,319 | 4/1960 | Proctor | 179—100.2 |

BERNARD KONICK, *Primary Examiner.*

A. I. NEUSTADT, *Assistant Examiner.*

U.S. Cl. X.R.

226—188; 242—55.12